United States Patent [19]

Stave

[11] 4,206,926
[45] Jun. 10, 1980

[54] VIDEO DISC PLAYER HAVING RECORD SIZE IDENTIFICATION APPARATUS

[75] Inventor: Frederick R. Stave, Indianapolis, Ind.

[73] Assignee: RCA Corporation, New York, N.Y.

[21] Appl. No.: 964,532

[22] Filed: Nov. 29, 1978

[30] Foreign Application Priority Data

Feb. 13, 1978 [GB] United Kingdom ............... 05732/78

[51] Int. Cl.² .............................................. G11B 17/04
[52] U.S. Cl. .................................... 274/9 B; 206/444;
206/309; 312/223; 340/686
[58] Field of Search .................. 360/86, 97, 133, 96.6,
360/96.5, 93; 358/128; 274/1 R, 1 B, 2, 9 R, 9
B; 206/444, 309, 312; 312/223, 10; 340/686

[56] References Cited

U.S. PATENT DOCUMENTS

| 3,439,919 | 4/1969 | Laa ........................................ 360/96.6 |
| 3,947,883 | 3/1976 | Suzuki ................................. 360/96.5 |
| 3,951,264 | 4/1976 | Heidecker et al. ................... 206/444 |
| 4,138,703 | 2/1979 | Stave et al. ......................... 360/133 |
| 4,145,726 | 3/1979 | Conaty ................................. 360/97 |

FOREIGN PATENT DOCUMENTS

2430377 1/1976 Fed. Rep. of Germany .......... 274/1 R

Primary Examiner—John W. Shepperd
Attorney, Agent, or Firm—Eugene M. Whitacre; Joseph S. Tripoli; Dilip A. Kulkarni

[57] ABSTRACT

A record is removably subject to occupancy of a protective caddy comprising a jacket and a record retaining spine. The record is enclosed in the caddy such that a first side of the record is associated with a given side of the spine. To load a record into a player, such as a video disc player, an occupied caddy is inserted into an input slot provided in the player. A record extracting mechanism mounted in the player removes the retaining spine and the associated record from the jacket during jacket withdrawal subsequent to the occupied cover arrival at a fully inserted position in the player, whereby the record and the spine are retained within the player. A switch mounted in the player is subject to conditioning in a first state in response to insertion of the occupied cover with the given side of the spine facing upward, and is subject to conditioning in a second state in response to cover insertion with the given side facing downward. An indicator responsive to the state of the switch and disposed on the front instrument panel of the player provides an indication of the record side subject to playback.

9 Claims, 7 Drawing Figures

VIDEO DISC PLAYER HAVING RECORD SIZE IDENTIFICATION APPARATUS

This invention generally relates to video disc players, and more particularly, to players suitable for use with a record bearing caddy.

In certain video disc systems, information is stored on a disc record in the form of geometric variations in the bottom of a continuous spiral groove disposed on the record surface. The variations in capacitance between an electrode incorporated in a groove-riding stylus and a conductive coating disposed on the record surface are sensed to reproduce the stored information. A capacitance-type video disc system is illustratively disclosed in U.S. Pat. No. 3,842,194 (Clemens).

In such systems, it is advantageous to mount a groove-riding pickup stylus in a demountable cartridge. The player is provided with rails for guiding a carriage, having a compartment for receiving the pickup cartridge, along a path. The carriage is driven during playback along the carriage guiding rails in correlation with the motion of the groove-riding stylus. U.S. Pat. No. 3,870,320 (Torrington), discloses a type of carriage translating system.

It is beneficial to enclose a record in a thin plastic caddy comprising a jacket and a record retaining spine. For record loading, an occupied caddy is inserted into an input slot provided in the player. The player is equipped with another set of rails for guiding caddy insertion along a further path. A record extracting mechanism disposed in the player removes the retaining spine and the associated record (hereinafter, record assembly) from the jacket during subsequent jacket withdrawal, whereby the record assembly is retained in the player. The player is equipped with a platform for supporting the retained record assembly, when it is disposed in an elevated position. The retained record is transferred to the turntable for playback during motion of the platform to a depressed position. For subsequent record retrieval, the platform, with the retained record assembly resting thereon, is raised, and an empty jacket is inserted into the player, thereby returning the record assembly back into the jacket. Withdrawal of the caddy, effects record removal from the player. U.S. patent application Ser. No. 801,604 (Torrington), illustrates a system suitable for use with such a record caddy. The Torrington application is assigned of record to the assignee of the instant application.

In such players, it is desirable that the player be provided with means for identifying the record side subject to playback. An apparatus, pursuant to the instant invention, includes switch means subject to conditioning in a first and a second state, respectively, in response to insertion of the caddy with a given side thereof facing upward and downward. An indicating means, responsive to the state of the switch means, is provided for indicating to the user of the player the record side subject to play.

Figure 1:
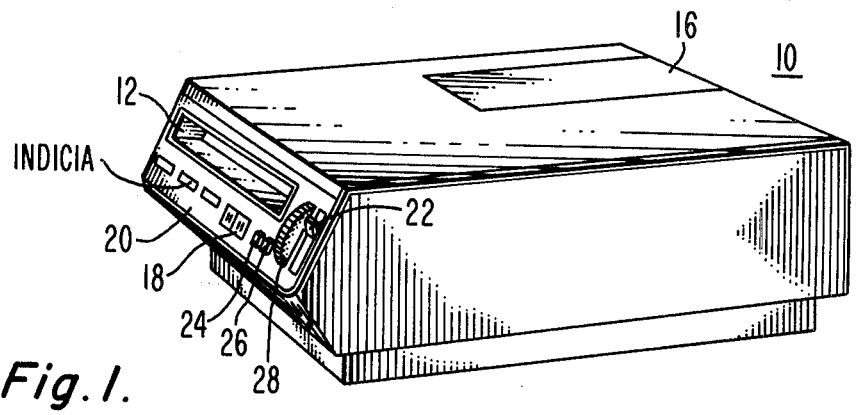
FIG. 1 illustrates a video disc player incorporating a record side identification apparatus pursuant to the principles of the present invention.
Figure 2:
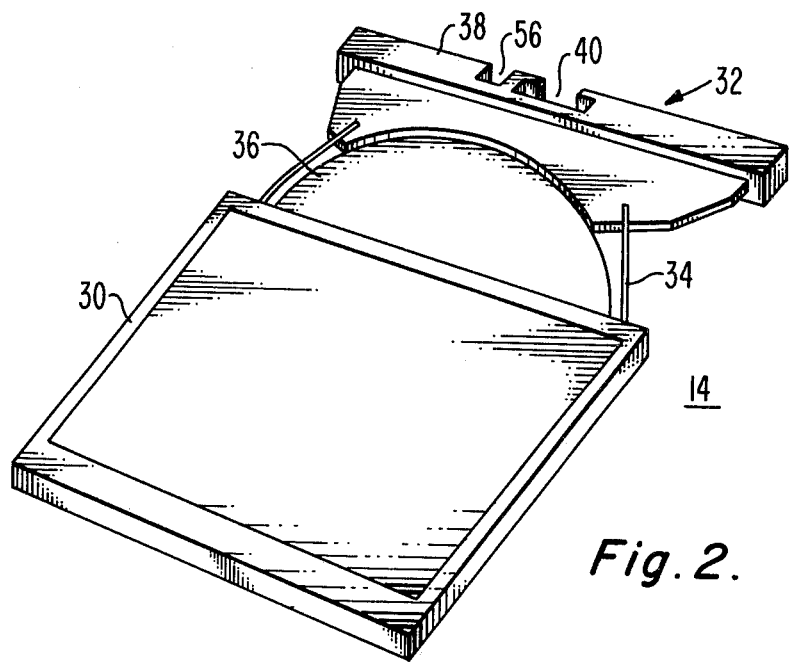
FIG. 2 shows a record caddy suitable for use with the player of FIG. 1.

As shown in FIG. 1, a video disc player 10, incorporating the record side identification apparatus in accordance with the present invention, has an input slot 12 through which a record caddy 14, illustrated in FIG. 2, is inserted for loading an enclosed record into the player. A groove-riding pickup stylus is mounted in a demountable cartridge which is installed in a compartment provided in a carriage reciprocably mounted in the player. A flap 16 is disposed on the cover section of the player for providing access to the pickup cartridge. The pickup cartridge is translated during playback in correlation with the motion of the groove-riding stylus to recover the recorded information from a turntable supported record. A dial 18 is provided on the front instrument panel 20 of the player for indicating playing time. A function selection lever 22 projects through a slot in the instrument panel, and is subject to selective positioning in one of the three positions thereof: OFF, DISC IN/OUT and PLAY. To load a record, the function selection lever is moved to the DISC IN/OUT position, and an occupied caddy is inserted into the player. The enclosed record is then retained in the player when the caddy is withdrawn. To play the retained record, the function selection lever is shifted to the PLAY position. Actuation of a pause button 24 suspends carriage translation and lifts the pickup stylus away from a turntable-supported record. For active scanning of the record, a search button 26 is depressed, and the carriage is translated by means of a thumbwheel 28 while the pickup stylus is in engagement with the turntable-supported record. The carriage can be translated at a speed variable over a range of speeds and in either direction by the thumbwheel.

Figure 3:
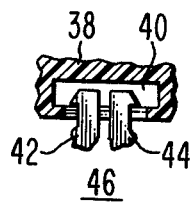
FIGS. 3 and 4 depict the operation of a record extracting mechanism mounted in the player of FIG. 1.
Figure 4:
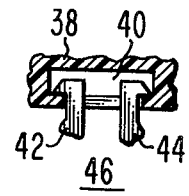

As shown in FIG. 2, the record caddy 14 comprises an outer jacket 30 and a record retaining member 32 removably located within the jacket. The retaining member comprises (1) an annular portion 34, that encircles the enclosed record 36, and (2) a spine portion 38, which serves as a closure to keep dust and debris from entering the record enclosing cavity. The spine has an opening 40 into which the latch arms 42 and 44 of a record extracting mechanism 46 (FIGS. 3 and 4) protrude during arrival of a record caddy at a fully inserted position in the player. The latch arms alternate between a closed condition (FIG. 3) and an open condition (FIG. 4), in response to each caddy arrival at the fully inserted position in the player.

A platform, mounted within the player 10 and responsive to the position of the function selection lever, is subject to motion between an elevated position and a depressed position. The DISC IN/OUT position and the PLAY position of the function selection lever, respectively, correspond to the elevated position and the depressed position of the platform. A pair of rails are mounted on the platform for guiding insertion of a caddy into the player housing along a path. The front ends of the caddy guiding rails are aligned with the input slot when the platform is occupying the elevated position for facilitating caddy insertion and extraction.

To load a record into the player, the latch arms 42 and 44 are disposed in the closed condition (FIG. 3), the function selection lever is shifted to the DISC IN/OUT position to dispose the platform in the elevated position, and an occupied caddy is inserted through the input slot 12. The latch arms 42 and 44 enter the opening 40 in the spine 38 as the caddy reaches the fully inserted position in the player. The engagement of the caddy with an actuating arm indexes the latch arms into the spread apart condition (FIG. 4), whereby the retaining member and the associated record (i.e., the record assembly) are locked to the platform. Subsequent withdrawal of the caddy removes the record assembly therefrom, thereby retaining the record assembly in the player resting on the raised platform. To transfer the retained record to a turntable rotatably mounted within the player, the platform is lowered to the depressed position.

For record retrieval, the above sequence is reversed. The platform, with the record assembly resting thereon, is raised. The platform is provided with a set of depressible lifting pads (not shown) to align the record assembly resting thereon with the caddy guiding rails to cause the return of the record assembly into an empty caddy during insertion thereof into the player. The engagement of the caddy with the actuating arm reindexes the latch arms to the closed condition, thereby freeing the record assembly from the player. Subsequent caddy withdrawal removes the enclosed record assembly therewith. It will be noted that throughout the above sequence the retaining member and the associated record always remain together, and that the orientation of one with respect to the other is constant.

Figure 5:
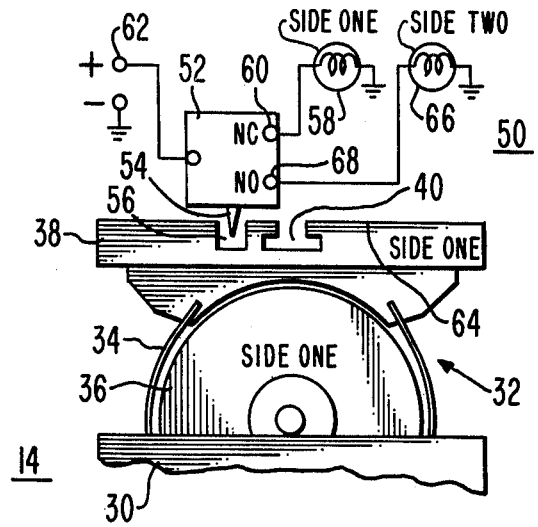
FIG. 5 is a schematic illustration of a first embodiment of the record side identification apparatus of the instant invention.

In such players, it is desirable that the player be provided with means for identifying the record side subject to play. Shown in FIG. 5 is a schematic representation of the first embodiment 50 of the record side identifying apparatus pursuant to the instant invention. As shown therein, the apparatus includes a microswitch 52 mounted in the player. The microswitch 52 has a sensor element 54 disposed in the caddy insertion path. When the caddy 14 is inserted into the player with the record "SIDE ONE" facing upward, as shown in FIG. 5, a cutout 56 disposed in the spine portion 38 prevents actuation of the microswitch 52. A light bulb 58, connected to a normally-closed terminal 60 of the microswitch, is coupled to a source of power supply 62, thereby lighting an indicia, "SIDE ONE", disposed on the front instrument panel of the player. When the caddy is loaded into the player with the record "SIDE TWO" facing upward, a portion 64 of the spine 38 (disposed on the side thereof opposite from the cutout 56) depresses the sensor element 54, whereby the microswitch 52 is activated coupling a light bulb 66 to the power supply source 62 via a terminal 68 of the microswitch. The terminal 68 is normally open in the absence of actuation of the sensor element 54 of the microswitch. The light bulb 66, when turned on, illuminates an indicia, "SIDE TWO", on the front instrument panel 20 of the player. The power supply source 62 is switched off when the player is turned off. Thus, it will be seen that the light bulbs 58 and 66 illuminate respective markings, "SIDE ONE" and "SIDE TWO", on the front instrument panel 20 of the player.

Figure 6:
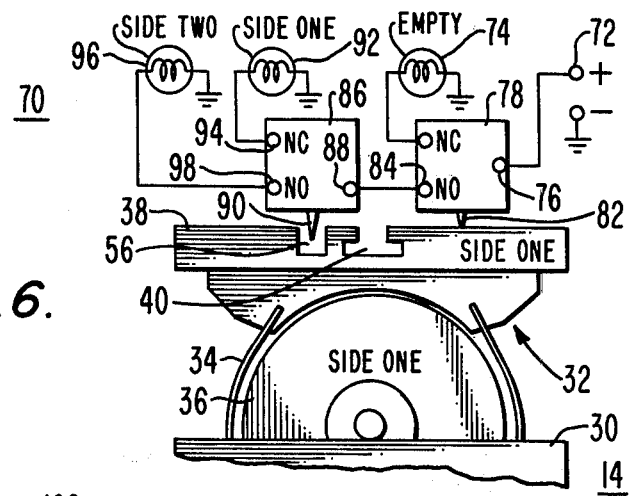
FIG. 6 is a schematic representation of a second embodiment of the record side identification apparatus in accordance with the present invention.

FIG. 6 is a schematic representation of a second embodiment 70 of the present invention. A power supply source 72 is turned on when the player is switched on. A light bulb 74, connected to a normally-closed terminal 76 of a microswitch 78, is coupled to the power supply source 72, thereby lighting an indicia, "PLAYER EMPTY", on the front instrument panel of the player when the player is turned on. When a caddy 14 is inserted into the player, the spine 38 depresses the sensor element 82 of the microswitch 78, whereby the light bulb 74 (illuminating the "PLAYER EMPTY" indicia) is turned off. A terminal 84 of the microswitch 78 is normally open, but is connected to the power supply source 72 upon actuation of the microswitch 78. A second microswitch 86 has a terminal 88 connected to the normally-opened terminal 84 of the first microswitch. The cutout 56 disposed in the spine portion 38 prevents actuation of a sensor element 90 of the second microswitch 86 when the caddy 14 is inserted into the player with the record "SIDE ONE" facing upward, whereby a light bulb 92, connected to a normally-closed terminal 94 of the second microswitch, is turned on. The light bulb 92, when turned on, illuminates an indicia, "SIDE ONE", on the front instrument panel of the player. When the caddy 14 is inserted into the player with the record "SIDE TWO" facing upward, both microswitches 78 and 86 are activated, whereby a light bulb 96 (connected to a normally-opened terminal 98 of the second microswitch) is turned on to the exclusion of the other light bulbs. When the light bulb 96 is turned on, it illuminates an indicia, "SIDE TWO", on the front instrument panel of the player. Thus, it will be seen that the "PLAYER EMPTY" light is turned on in the absence of a record in the player, the "SIDE ONE" light is switched on when the caddy is inserted into the player with the record "SIDE ONE" facing upward, and the "SIDE TWO" light is illuminated when the caddy is inserted into the player with the record "SIDE TWO" facing upward.

Figure 7:
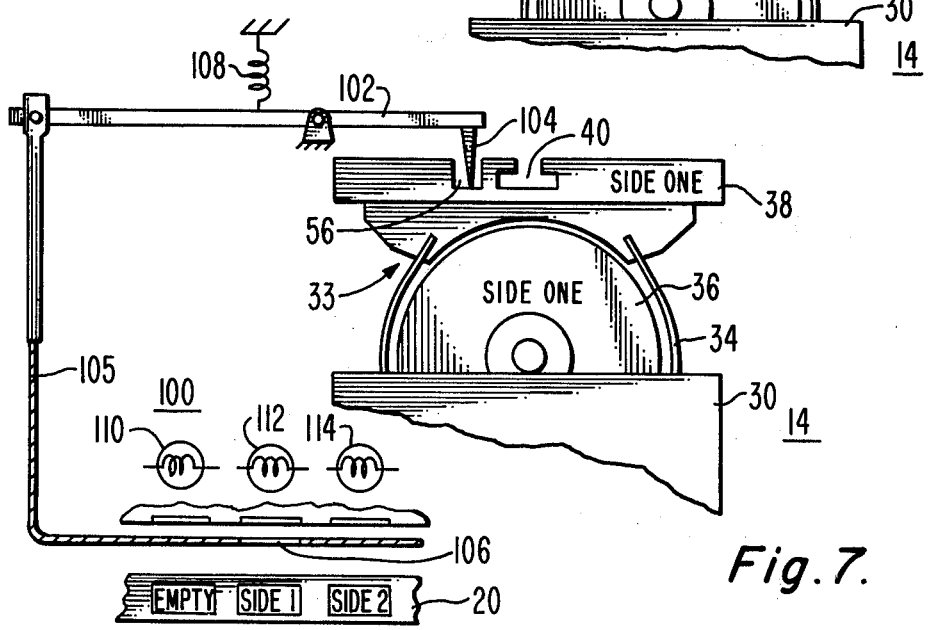
FIG. 7 diagrammatically represents a third embodiment of the record side identification apparatus pursuant to the instant invention.

FIG. 7 diagrammatically illustrates a third embodiment 100 of the record side identifying apparatus of the instant invention. The apparatus includes an actuating lever 102 pivotally secured to the housing of the player. A sensor element 104 is disposed at one end of the actuating lever 102 extending into the caddy insertion path. The other end of the actuating lever 102 is connected to a flexible shutter member 105 disposed in the vicinity of the front instrument panel 20 of the player. The flexible shutter 105 has a window 106 which is subject to selective alignment with indicia "PLAYER EMPTY", "SIDE ONE" and "SIDE TWO" disposed on the front instrument panel of the player. In the absence of a record in the player, a coil spring 108 urges the actuating lever 102 to occupy a first position, thereby disposing the window 106 in alignment with the indicia, "PLAYER EMPTY". When the caddy is inserted into the player with the record "SIDE ONE" facing upward, the spine portion 38 (with the cutout 56 in alignment with the sensor element 104) disposes the actuating lever 102 in a second position as shown in FIG. 7, whereby the window 106 is aligned with the indicia, "SIDE ONE". Insertion of the caddy with the record "SIDE TWO" on top, disposes the actuating lever 102 such that the window 106 is aligned with the indicia, "SIDE TWO". Light bulbs 110, 112 and 114 illuminate respective indicia through the window 106.

What is claimed is:

1. In a player for use with a disc record removably subject to occupancy of a protective cover comprising a jacket and a record retaining spine removably located within said jacket; said record being enclosed in said cover such that a first side of said record is associated with a given side of said spine; said player having an input slot through which an occupied cover is inserted to load an enclosed record therein; said player additionally including a record extracting mechanism for removing said retaining spine from said jacket during jacket withdrawal subsequent to an occupied cover arrival at a fully inserted position in said player, thereby retaining said spine and said associated record in said player; apparatus comprising:

(A) first means subject to conditioning in a first state in response to insertion of an occupied cover with said given side of said spine facing upward, and subject to conditioning in a second state in response to cover insertion with said given side facing downward in response to a discontinuity disposed in said cover; and (B) second means responsive to the state of said first means for providing an indication of the record side subject to playback.

2. An apparatus in accordance with claim 1 wherein said first means is subject to further conditioning in a third state in response to absence of said record retaining spine from said player; wherein said second means, responsive to said third state of said first means, serves additionally to provide an indication of lack of a record in said player.

3. An apparatus in accordance with claim 1 for use with a protective cover wherein said discontinuity in said cover comprises a cutout disposed in said record retaining spine located asymmetrically about a line bisecting said cover, and extending parallel to the direction of insertion of said cover into said player; wherein said first means includes means for sensing said cutout in said record retaining spine.

4. An apparatus in accordance with claim 1 for use with a protective cover wherein the record retaining spine has a discontinuity asymmetrically disposed about a line bisecting said cover, and extending parallel to the direction of said cover insertion into said player; wherein said first means includes means for sensing presence of said discontinuity in said record retaining spine.

5. An apparatus in accordance with claim 4 for use with a two-sided, disc record; wherein said sensing means includes a microswitch having three terminals; said second means including a pair of lights; each one of said lights representing the respective one of said record sides; wherein the first one of said terminals is connected to one of said lights; wherein the second one of said terminals is connected to the other of said lights; wherein the remaining terminal of said microswitch is connected to a source of energy supply.

6. An apparatus in accordance with claim 5 wherein said sensing means further includes a second microswitch, responsive to the presence of said record retaining spine in said player, and also having three terminals; said second means additionally including a third light representing absence of a record from said player; said third light being coupled to the first one of said terminals of said second microswitch; the second terminal of said second microswitch being coupled to said source of energy supply; the remaining terminal of said second microswitch being coupled to said remaining terminal of said first-mentioned microswitch.

7. An apparatus in accordance with claim 4 for use with a two-sided disc record; wherein said sensing means includes a member subject to disposition at a first location and a second location respectively in response to the disposition of said discontinuity of said record retaining spine in said player.

8. An apparatus in accordance with claim 7 wherein said member is additionally subject to disposition in a third location in response to the absence of said record retaining spine from said player.

9. An apparatus as defined in claim 7 for use with said player which further includes indicia identifying the respective one of said record sides; said second means including a shutter connected to said member for exposing a selected one of said record side identifying indicia.

* * * * *

UNITED STATES PATENT AND TRADEMARK OFFICE
CERTIFICATE OF CORRECTION

PATENT NO. : 4,206,926

DATED : June 10, 1980

INVENTOR(S) : Frederick Roland Stave

It is certified that error appears in the above-identified patent and that said Letters Patent is hereby corrected as shown below:

In the title, "SIZE" should read --SIDE--

Column 2, line 20, "cartridge" should read --carriage--

Signed and Sealed this

Twelfth Day of August 1980

[SEAL]

Attest:

SIDNEY A. DIAMOND

Attesting Officer

Commissioner of Patents and Trademark